Patented Feb. 8, 1944

2,341,062

UNITED STATES PATENT OFFICE 2,341,062

ELECTRICAL INSULATING MATERIAL AND PROCESS OF MAKING SAME

Hans Stager, Zurich, Switzerland

No Drawing. Application November 6, 1939, Serial No. 303,162. In Switzerland November 11, 1938

13 Claims. (Cl. 260—59)

The present invention concerns new hardenable condensation products suitable for use as electrical insulating materials, and it includes both the products themselves and their manufacture, as well as their use in the industry of electrical insulating materials.

It is known that the artificial resins which are not capable of being hardened, that is, the thermoplastic artificial resins, such as are obtained for instance by the condensation of aniline and formaldehyde in an acid medium, with subsequent removal of acid or by polymerisation of styrene and similar products, are considerably superior to the condensation products obtained from phenols and formaldehyde, which are capable of being hardened, in point of view of their suitability for use as electrical insulating media, since they are remarkable for particularly low dielectric losses, as well as for the fact that the dielectric losses are only slightly dependent on the frequency and further for their increased stability against surface leakage. However, the use of these non-hardenable artifical resins is impossible in many cases, as the softening which takes place at raised temperatures is not permissible. Therefore, the use of hardenable artificial resins in spite of their poorer properties has, in many cases, been compulsory.

The present invention now relates to a process whereby hardenable condensation products derived from hydroxyaryl compounds and formaldehyde have conferred upon them, by suitable alteration of the molecular structure, electrical properties which are comparable with those of the thermoplastic types.

It has actually been observed that the phenol hydroxyl group in the molecule of the normal phenoplastics forms that group which may be responsible for the dielectric losses under the influences of the electric alternating field and the temperature.

Proceeding from this observation, it has been found possible to fix this group by chemical means in such a manner that it almost completely loses its free mobility in an electrical field.

According to the invention, this fixation takes place when the arylhydroxyl groups are reacted upon by compounds which, on the one hand, are able to give rise to etherified aryloxy groups, which, in contrast to the unetherized arylhydroxy groups, exhibit a greatly reduced mobility in the electrical field, and which, on the other hand, themselves introduce no polar groups into the phenoplastic molecule.

It has been shown that aralkyl compounds are able to bring about this result in an excellent manner. Especially valuable compounds in this respect are: benzyl compounds, such as benzyl chloride, dibenzyl sulphate and their homologues, or unsaturated aralkyl compounds, such as styryl chloride, etc., whereas alkyl compounds, particularly those of low molecular weight, such as methyl or ethyl compounds, do not produce the desired effect. Acyl compounds have also proved to be unsatisfactory, on account of the polar groups which are thereby introduced into the phenoplastic molecule.

The process forming the present invention thus depends on an etherification of the arylhydroxyl groups, whereby, by suitable direction of the reaction, care is taken at the same time that no polar groups are introduced into the phenoplastic molecule, or that no such groups will be present in the hardened end-product.

In order to obtain a sufficient improvement of the dielectric properties of the hardened end-product, at least a 25 per cent etherification has been found to be necessary. Considerably better results are obtained if about 50 per cent of the arylhydroxyl groups are etherified.

As a rule, the degree of etherification finds its limit in the fact that too highly etherified condensation products are more difficult to harden.

The hardening properties of the products may be regulated or improved if additional quantities of formaldehyde corresponding to the degree of etherification are used. If, for example, the normal quantity of formaldehyde for the non-etherified condensation products amounts to 1 mol per mol of oxyaryl compound, it is thus advantageous to increase the molar quantity of formaldehyde according to the degree of etherification. Thus, in the case of a 25 per cent etherification, an increase in formaldehyde of about ¼ mol is recommended: similarly, with a 50 per cent etherification, about ½ mol increase is advisable. Through these additional formaldehyde quantities a consolidation of the molecule on resinification is obtained. The additional formaldehyde may be added either from the beginning or only when the etherification takes place or even after etherification. In place of formaldehyde, substances which split off formaldehyde, such as paraformaldehyde, may be used.

Hydroxyaryl formaldehyde condensation products both made in an alkaline and in an acid medium are capable of being used for the etherification according to the present invention. The etherification is advantageously combined with the condensation. For instance the etherifying agent may be added to the alkaline or in the case of an acid condensation to the alkalinized condensation solution. The proportion of the alkali is advantageously adjusted to the degree of etherification viz. there is used ¼ mol of alkali for each mol of the hydroxyaryl compound in the case of a 25 per cent etherification and ½ mol in the case of a 50 per cent etherification. If the condensation is made under alkaline conditions one may either add one part of the alkali right from the beginning and the other part before or after the etherification or alternatively the whole quantity of alkali necessary both in the condensation and etherification processes may be added from the beginning. When the condensation is carried out in an acid medium the alkali necessary in the etherification process may either be added partly before and partly after the etherification or alternatively the whole quantity may be added before the etherification.

As suitable hydroxyaryl compounds may be mentioned phenol, o-, m- and p-cresol, or the technical mixture of the three cresols. Especially good results are obtained when using m-cresol or mixtures which contain m-cresol in predominating quantities.

The etherification is preferably carried out on the not yet resinous initial condensation products. However, higher degrees of condensation may also come into consideration for this purpose.

The following is, for example, an advantageous method of carrying out the process according to the above statements. The hydroxyaryl compound is, on the one hand condensed with a more than equi-molecular quantity of formaldehyde in the presence of a less than equivalent quantity of an alkaline reacting condensing agent, and on the other hand etherified to a degree of at least 25 per cent with an aralkyl compound of the aforesaid type, for instance benzylchloride, both the quantity of alkali and the excess of formaldehyde being adjusted to the degree of etherification. It lies of course in the scope of the present invention that the reaction is carried out in such a manner that the product of the process, after hardening, contains, as far as possible, no polar groups other than the non-etherified arylhydroxyl groups.

The hardenable products obtained by the present process are remarkable in the hardened condition for appreciably smaller dielectric losses and for a practically negligible degree of dependence of these losses on frequency and temperature as compared with the known hardenable phenol-formaldehyde condensation products: further, in comparison to these latter products, they show an appreciably higher stability against surface leakage. As compared with the thermoplastics, they possess the advantage of being resistant to temperature in addiiton to having similar dielectrical properties.

They are suitable for use, therefore, in such instances where, on the one hand, dielectrical properties of a particularly high degree, on the other hand, high resistance to temperatures are necessary, as for example, in the technique of telephone and television, in the radio industry, etc.

The products may be used both in the pure state as cast resins as well as in solution or in admixture with suitable additions, such as filling substances, dyestuffs, softeners, for example as lacquers, impregnating agents, impregnation lacquers, binding agents for moulded articles, laminated paper, etc. According to the object of the invention, additions should preferably be avoided which will lower the high degree of the electrical properties of these condensation products. Their use as cements, for example, porcelain cements, or in the preparation of enamel lacquered wires in the electrical industry may, among others, be mentioned as special applications of these products.

The process is illustrated by the following examples without thereby limiting its scope.

*Example 1*

94 gms. (1 mol) phenol are mixed with
37.5 gms. (1.25 mol) formaldehyde (40 per cent volume) and
10 gms. (0.25 mol) caustic soda in the form of a 10 per cent solution.

The mixture is then allowed to stand 6 days at room temperature. 31.63 gms. (¼ mol) benzyl chloride are added to the solution thus obtained and the mixture is stirred for one hour at 95° C. A light-brown resin separates out, which is washed free from chloride with water and is dried at 100° C. under diminished pressure.

The resin may be hardened by heating in known manner at 100–150° C. It may be used as a hardenable adhesive of valuable dielectric properties.

*Example 2*

188 gms. (2 mol) phenol are mixed with
90 gms. (3 mol) formaldehyde (40 per cent by volume) and
40 gms. (1 mol) caustic soda in the form of a 10 per cent solution.

The mixture is allowed to stand as in Example 1. 126.5 gms. (1 mol) benzyl chloride are then added, and the mixture is stirred for one hour at room temperature and then for one hour at 95° C. The aqueous liquor is decanted from the resin deposited, and the latter is dried at 112° C. under reduced pressure. It may be hardened as described in Example 1 and used for the same purpose as mentioned there.

*Example 3*

108 gms. (1 mol) m-cresol are mixed with
20 gms. (½ mol) caustic soda in the form of a 10 per cent solution, while cooling with water, and
45 gms. (1½ mol) formaldehyde (40 per cent by volume) are added.

The mixture is stirred at room temperature, whereupon the temperature rises to 40° C. After about one hour's stirring, the mixture is cooled down to about 10° C., and 63.26 gms. (½ mol) benzyl chloride are added. Stirring is continued for a further period of one hour, and then the mixture is heated slowly on the water-bath. The temperature is maintained for ¼ hour at the boiling point, and the mix is then cooled down. The resin is taken up in ether, washed with water until free from electrolytes and, after removal of the ether by distillation, dried under reduced pressure at 100° C. The resin is hardenable by heating.

*Example 4*

108 gms. (1 mol) meta-cresol,
94 gms. (1 mol) phenol,
90 gms. (3 mol) formaldehyde (40 per cent by volume), and
40 gms. (1 mol) caustic soda in the form of a 10 per cent solution are allowed to react with one another for 48 hours at 20° C. The condensation mixture is then cooled down, and 126.5 gms. (1 mol) benzyl chloride are then added. The mixture is then stirred for 1½ hours, cooling with water, then heated on the water-bath and maintained for one hour at the temperature of the boiling water-bath. The resulting resin is taken up with ether and worked up as described in Example 3.

*Example 5*

94 gms. (1 mol) phenol are mixed with
30 gms. (1 mol) formaldehyde (40 per cent by volume) and
10 gms. (0.25 mol) of caustic soda in the form of a 10 per cent solution, and allowed to stand 6 days at room temperature. To the solution thus obtained there are added 31.63 gms. (¼ mol) benzyl-chloride and 7.5 gms. (¼ mol) formaldehyde (40 per cent by volume), whereupon the mixture is stirred for 1 hour at 95° C. A yellowish brown resin separates out which is worked up as indicated in Example 1 and may be hardened as indicated there.

*Example 6*

94 gms. (1 mol) phenol are mixed with
0.4 gm. (1/100 mol) caustic soda in the form of a 10 per cent solution, and
37.5 gms. (1.25 mol) formaldehyde (40 per cent by volume) and allowed to stand 6 days at room temperature. To the solution thus obtained there are added 9.6 gms. caustic soda (10 per cent solution) and 31.63 gms. (¼ mol) benzyl-chloride and the mixture stirred for 1 hour at 95° C. A yellowish brown resin separates out which is worked up as indicated in Example 1, and may be hardened as mentioned there.

*Example 7*

188 gms. (2 mol) phenol are mixed with
30 gms. (1 mol) formaldehyde (40 per cent by volume) and
0.15 gm. (about 1/200 mol) hydrochloric acid (40 ccm. 1/10 n. solution).

The mixture is stirred for 50 minutes at 96° C. and then cooled down to about 10° C. The hydrochloric acid is neutralized with 40 ccm. 1/10 n. caustic soda solution, whereupon 20 gms. caustic soda in the form of a 10 per cent solution and 63.26 gms. (½ mol) benzylchloride are added. The reaction mixture is heated, mixed with 45 gms. (1.5 mol) formaldehyde (40 per cent by volume) and further kept at the temperature of the boiling water-bath for 1 hour. The resin is then worked up as described in the usual manner.

What I claim is:

1. Process for the manufacture of hardenable condensation products suitable for use as high grade electrical insulating materials, wherein a phenol is, on the one hand, condensed with a more than equimolecular quantity of formaldehyde in the presence of a less than equivalent quantity of an alkaline reacting condensing agent and, on the other hand, etherified to a degree of at least 25 per cent with a compound selected from the group consisting of aralkyl halides and aralkyl sulphates, both the molecular ratio of formaldehyde in excess of the equimolecular ratio and the molecular ratio of alkali corresponding approximately to the molecular ratio of aralkyl compound used with respect to the phenol.

2. Process for the manufacture of hardenable condensation products suitable for use as high grade electrical insulating materials, wherein phenol is, on the one hand, condensed with a more than equimolecular quantity of formaldehyde in the presence of a less than equivalent quantity of an alkaline reacting condensing agent, and, on the other hand, etherified to a degree of at least 25 per cent with a compound selected from the group consisting of aralkyl halides and aralkyl sulphates, both the molecular ratio of formaldehyde in excess of the equimolecular ratio and the molecular ratio of alkali corresponding approximately to the molecular ratio of aralkyl compound used with respect to the phenol.

3. Process for the manufacture of hardenable condensation products suitable for use as high grade electrical insulating materials, wherein m-cresol is, on the one hand, condensed with a more than equimolecular quantity of formaldehyde in the presence of a less than equivalent quantity of an alkaline reacting condensing agent and, on the other hand, etherified to a degree of at least 25 per cent with a compound selected from the group consisting of aralkyl halides and aralkyl sulphates, both the molecular ratio of formaldehyde in excess of the equimolecular ratio and the molecular ratio of alkali corresponding approximately to the molecular ratio of aralkyl compound used with respect to the m-cresol.

4. Process according to claim 1 wherein an alkaline reaction medium is employed and the initial non-resinous condensation products obtained in such alkaline medium are etherified.

5. Process for the manufacture of hardenable condensation products suitable for use as high grade electrical insulating materials, wherein a phenol is, on the one hand condensed with a more than equimolecular quantity of formaldehyde in the presence of a less than equivalent quantity of an alkaline reacting condensing agent and, on the other hand, etherified to a degree of at least 25 per cent with a benzyl halide, both the molecular ratio of formaldehyde in excess of the equimolecular ratio and the molecular ratio of alkali corresponding approximately to the molecular ratio of aralkyl compound used with respect to the phenol.

6. As new articles of manufacture suitable as high grade electrical insulation material, hardenable condensation products derived from a phenol and more than an equimolecular proportion of formaldehyde, the phenolic hydroxyl groups of which are etherified in an alkaline medium to a degree of at least 25 per cent with a compound selected from the group consisting of aralkyl halides and aralkyl sulfates bearing no polar groups in addition to the reactive group, both the molecular ratio of formaldehyde in excess of the equimolecular ratio and the molecular ratio of alkali corresponding approximately to the molecular ratio of aralkyl compound used with respect to the phenol, said compounds exhibiting in the hardened state particularly low dielectric losses and a practically negligible degree of dependence of these losses on frequency and temperature and also exhibiting high stability against surface leakage.

7. As new articles of manufacture suitable as high grade electrical insulation material, hardenable condensation products derived from phenol and more than an equimolecular proportion of formaldehyde, the phenolic hydroxyl groups of which are etherified in an alkaline medium to a degree of at least 25 per cent with a compound selected from the group consisting of aralkyl halides and aralkyl sulfates bearing no polar groups in addition to the reactive group, both the molecular ratio of formaldehyde in excess of the equimolecular ratio and the molecular ratio of alkali corresponding approximately to the molecular ratio of aralkyl compound used with respect to the phenol, said compounds exhibiting in the hardened state particularly low dielectric losses and a practically negligible degree of dependence of these losses on frequency and temperature and also exhibiting high stability against surface leakage.

8. As new articles of manufacture suitable as high grade electrical insulation material, hardenable condensation products derived from m-cresol and more than an equimolecular proportion of formaldehyde, the phenolic hydroxyl groups of which are etherified in an alkaline medium to a degree of at least 25 per cent with a compound selected from the group consisting of aralkyl halides and aralkyl sulfates bearing no polar groups in addition to the reactive group, both the molecular ratio of formaldehyde in excess of the equimolecular ratio and the molecular ratio of alkali corresponding approximately to the molecular ratio of aralkyl compound used with respect to the phenol, said compounds exhibiting in the hardened state particularly low dielectric losses and a practically negligible degree of dependence of these losses on frequency and temperature and also exhibiting high stability against surface leakage.

9. As new articles of manufacture suitable as high grade electrical insulation material, hardenable condensation products derived from a phenol and more than an equimolecular proportion of formaldehyde, the phenolic hydroxyl groups of which are etherified in an alkaline medium to a degree of at least 25 per cent with a benzyl halide, both the molecular ratio of formaldehyde in excess of the equimolecular ratio and the molecular ratio of alkali corresponding approximately to the molecular ratio of aralkyl compound used with respect to the phenol, said compounds exhibiting in the hardened state particularly low dielectric losses and a practically negligible degree of dependence of these losses on frequency and temperature and also exhibiting high stability against surface leakage.

10. High grade electrical insulators exhibiting particularly low dielectric losses and a practically negligible degree of dependence of these losses on frequency and temperature and also exhibiting high stability against surface leakage, comprising hardenable condensation products derived from a phenol and more than an equimolecular proportion of formaldehyde, the phenolic hydroxyl groups of which are etherified in an alkaline medium to a degree of at least 25 per cent with a compound selected from the group consisting of aralkyl halides and aralkyl sulfates bearing no polar groups in addition to the reactive group, both the molecular ratio of formaldehyde in excess of the equimolecular ratio and the molecular ratio of alkali corresponding approximately to the molecular ratio of aralkyl compound used with respect to the phenol.

11. High grade electrical insulators exhibiting particularly low dielectric losses and a practically negligible degree of dependence of these losses on frequency and temperature and also exhibiting high stability against surface leakage, comprising hardenable condensation products derived from a phenol and more than an equimolecular proportion of formaldehyde, the phenolic hydroxyl groups of which are etherified in an alkaline medium to a degree of at least 25 per cent with a benzyl halide, both the molecular ratio of formaldehyde in excess of the equimolecular ratio and the molecular ratio of alkali corresponding approximately to the molecular ratio of aralkyl compound used with respect to the phenol.

12. High grade electrical insulators exhibiting particularly low dielectric losses and a practically negligible degree of dependence of these losses on frequency and temperature and also exhibiting high stability against surface leakage, comprising hardenable condensation products derived from phenol and more than an equimolecular proportion of formaldehyde, the phenolic hydroxyl groups of which are etherified in an alkaline medium to a degree of at least 25 per cent with a compound selected from the group consisting of aralkyl halides and aralkyl sulfates bearing no polar groups in addition to the reactive group, both the molecular ratio of formaldehyde in excess of the equimolecular ratio and the molecular ratio of alkali corresponding approximately to the molecular ratio of aralkyl compound used with respect to the phenol.

13. High grade electrical insulators exhibiting particularly low dielectric losses and a practically negligible degree of dependence of these losses on frequency and temperature and also exhibiting high stability against surface leakage, comprising hardenable condensation products derived from m-cresol and more than an equimolecular proportion of formaldehyde, the phenolic hydroxyl groups of which are etherified in an alkaline medium to a degree of at least 25 per cent with a compound selected from the group consisting of aralkyl halides and aralkyl sulfates bearing no polar groups in addition to the reactive group, both the molecular ratio of formaldehyde in excess of the equimolecular ratio and the molecular ratio of alkali corresponding approximately to the molecular ratio of aralkyl compound used with respect to the phenol.

HANS STAGER.